UNITED STATES PATENT OFFICE 2,480,822

ORGANO SUBSTITUTED SILICON POLYMERS AND METHOD OF MAKING THEM

James Franklin Hyde, Corning, N. Y., assignor to Corning Glass Works, Corning, N. Y., a corporation of New York No Drawing. Application May 27, 1946, Serial No. 672,695

2 Claims. (Cl. 260—448.2)

This application is a continuation-in-part of my copending application Serial Number 432,528, filed February 26, 1942, and Serial Number 514,410, filed December 15, 1943, now Patent 2,457,677, which applications disclose all the subject matter hereof. This invention relates to the products obtained by the hydrolysis and dehydration of organosilicanes.

The hydrolysis of a silicane of the type $SiX_4$, where X is any hydrolyzable atom or group, such as halogen, alkoxy, hydrogen, etc., does not result in a simple hydroxy compound but produces instead a brittle, insoluble, infusible gel comprising a three-dimensional network of structural units composed of siloxane linkages as a result of the concurrent or subsequent loss of water from the intermediately formed hydroxy compound.

*Type I*

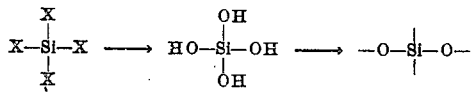

The formation of a siloxane linkage requires the close approach of two hydroxyl groups. It is apparent that, in the formation of such a rigid structure, many hydroxyl groups become isolated and block some of the possible cross linkages. As the structural network becomes more complicated, dehydration becomes increasingly more difficult, and the result is a partially dehydrated silica gel of poor dimensional stability.

Organo substituted silicanes of the type $RSiX_3$ are prepared by means of the well known Grignard reaction, where R may be any organic radical which is capable of reacting with magnesium to form a Grignard reagent and which is attached to silicon through a carbon atom. Such organo substituted silicanes are also hydrolyzed on treatment with water, although the reaction is less vigorous than in the case of the unsubstituted silicane under comparable conditions. Here, also concurrent dehydration or condensation with splitting out of water may occur so that a partially dehydrated product may result which can further be dehydrated by heat.

*Type II*

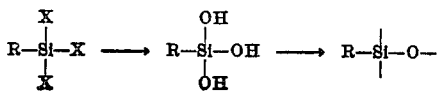

Here it will be seen that in each structural unit one of the four silicon bonds is blocked by the organic radical R, and only three siloxane linkages can form. Such compounds are still capable of three-dimensional polymerization.

The chemical and structural changes occurring in this type of substituted silicanes are the same as those described above in the formation of silica gel. The chief distinction arises from the fact that the property of solubility in organic solvents, particularly in the lower stages of condensation, is acquired due to the presence of the organic radical. The tendency of intermediate partially dehydrated products to further dehydrate is also decreased. The latter tendency is more noticeable with increasing size of the radical. As the stage of essentially complete dehydration is approached, the mono-substituted products, which in reality are substituted silica gels, lose their solubility and become hard and brittle. However, there is a marked improvement in dimensional stability over silica gel.

On substituting a second organic radical, which is attached to silicon through a carbon atom and which may or may not be different from the first, a silicane of the type $RR'SiX_2$ results. Such compounds also may be hydrolyzed and dehydrated, the dehydration probably proceeding to some extent concurrently with the hydrolysis, particularly if the temperature is allowed to rise.

*Type III*

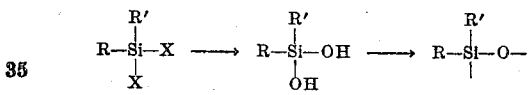

In each structural unit two of the four silicon bonds are now blocked by the organic radical R and R', and only two siloxane linkages are possible. Hence a three-dimensional network is no longer possible and the resulting organo-siloxanes can comprise only chain and cyclic structures. Intermediate crystalline de-hydroxy compounds can in some instances be isolated. The final products which are usually resinous in character bear little physical resemblance to silica gel but are closely related thereto in chemical structure, differing only in the restriction of possible siloxane linkages.

Organo substituted silicanes of the type $RR'R''SiX$, when hydrolyzed and dehydrated, yield very simple oxides in the structural unit of which three of the four silicon bonds are blocked by the organic radicals R, R' and R".

Type IV

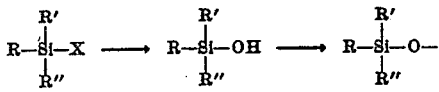

In this case, ease of hydrolysis is further diminished and in some cases the intermediate hydroxy silicanes can be isolated. The completely dehydrated product is dimeric because only one siloxane linkage can be formed. The dimers are either crystalline or liquid.

Prior attempts to utilize the above described reactions have not contemplated combinations thereof, but have been confined more or less to the individual reactions and their products. Such products, as shown above, have limited utility and the range of properties obtainable in the products of a given type of reaction is relatively restricted. For example, the product resulting from Type I reaction is an insoluble, infusible gel of little utility; Type IV reaction yields generally inert liquid products which, although they are soluble in organic solvents, cannot be polymerized beyond the dimer and hence cannot be utilized per se for coating compositions, resinous impregnants and the like.

An object of this invention is the production of new and useful products from these reactions which will have desirable predetermined properties.

Another object is to combine the above described reactions and thus to inter-condense the hydrolysis products of a plurality of substituted and unsubstituted organo silicanes.

Another object is to produce liquid products of varying viscosity.

The new method comprises mixing predetermined quantities of two or more compounds of the types, $SiX_4$, $RSiX_3$, $RR'SiX_2$, and $RR'R''SiX$, where R, R' and R" are the same or different organic radicals and X is any hydrolyzable atom or group, or two or more compounds of any one of these types, except Type I, the organic radical or radicals being different for each compound, and causing them to hydrolyze together and to become inter-condensed. This is best accomplished by introducing into the mixture by dropwise addition thereto the amount of water which is calculated for complete hydrolysis of the mixture and which preferably is dissolved in from two to four volumes of a common solvent such as alcohol, dioxan, acetic acid, acetone, etc. Although a difference in the reactivity of the various individual types of hydrolyzable compounds and a variation in the amounts present in the initial mixture may make it desirable to vary the conditions of the process, as will appear from a consideration of the accompanying examples, the above recited procedure in general is to be preferred. The use of a water miscible solvent for diluting the hydrolyzable mixture or the water or both and the dropwise addition of the water insures the maintenance of homogeneity during hydrolysis. Under these conditions condensation or the formation of siloxane linkages occurs concurrently with the hydrolysis, but it is to be understood that the extent of further subsequent dehydration is optional and will depend largely upon the use to which the product will be put.

In any hydrolyzable silicanes, one or more of which is organo substituted through C-Si linkage and contains on the average from one to two hydrolyzable atoms or groups attached to the silicon atom, co-hydrolysis and dehydration by this method will result in inter-condensation or formation of interconnecting oxygen linkages between the silicon atoms of the various silicanes. The variety of the substituted organic radicals is limited only by their ability to form a Grignard reagent. In other words, the organo silicanes which may be employed in my process include all such compounds which contain one or more hydrolyzable atoms or groups and which may be prepared by means of the well-known Grignard reaction. The radicals which may thus be substituted may include alkyl radicals such as methyl, ethyl, propyl, isopropyl, butyl, isobutyl, amyl, hexyl, heptyl, to octadecyl and higher; alicyclic radicals such as cyclopentyl, cyclohexyl, etc.; aryl and alkaryl radicals such as phenyl, mono-and poly-alkyl phenyls as tolyl, xylyl, mesityl, mono-, di-, and tri-ethyl phenyls, mono-, di- and tri-propyl phenyls, etc.; naphthyl, mono- and poly-alkyl naphthyls, as methyl naphthyl, diethyl naphthyl, tripropyl naphthyl, etc.; tetrahydro-naphthyl; anthracyl, etc.; aralkyl such as benzyl, phenylethyl, etc.; alkenyl such as methallyl, allyl etc.

If the hydrolyzable group or groups of all of the silicanes in the mixture to be hydrolyzed are halogens, it is preferable to employ dioxan as the solvent because it is inert to the halogens. If the mixture contains both halogens and alkoxy groups the former can be converted to the latter by the slow addition of dry alcohol to the mixture, or the mixture can be diluted with dioxan and treated with aqueous alcohol. When the mixture contains only alkoxy groups any water miscible solvent may be used together with a trace of acid such as HCl as catalyst. In this case, alcohol may be preferred on account of its relatively low cost. Mixtures of water miscible solvents may be used.

In the above described method, the slow incorporation of water into the homogeneous solution ensures that hydrolysis is not permitted to proceed unchecked whereby the more reactive silicane or silicanes, that is, silicanes containing few or no substituted organic radicals per silicon atom, would be more completely hydrolyzed and condensed before the less reactive or more highly substituted silicanes have had an opportunity to react. On the contrary, the less reactive silicanes are thus given a greater opportunity to hydrolyze simultaneously with the more reactive silicanes than would be the case if the hydrolysis were conducted rapidly. Under these circumstances, simultaneous condensation of the various intermediate hydroxy compounds takes place and an intimate intermolecular combination though siloxane linkages of silicon atoms bearing different numbers and kinds of organic radicals becomes possible to the fullest extent. This insures a true inter-condensation with the formation of homogeneous products containing mixed unit structures.

After removal of solvent and excess water the hydrolysis products resulting from the above process are water-immiscible liquids of varying viscosity. They are soluble in the common organic solvents such as benzene, toluene, etc. Many of them are thermoplastic, some are thermosetting, and some are thermally stable liquids. Further condensation and polymerization may be brought about by heating, which generally results in an increase in viscosity. The desired degree of polymerization will depend largely upon the relative amounts of the various types of silicanes initially present.

The various classes of organo-siloxanes which can be produced by my method may be represented in the following manner as combinations of the various structural units, bearing in mind that the structural units are chemically combined with each other by siloxane linkages, that the percentage of each type of unit may be varied at will and that the properties of the resulting products will show corresponding variations which can be predicted in making compositions for a particular purpose. In the following clases the formulae corresponding to the structural units, exclusive of the oxygen, are given.

*Class 1*

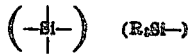

*Class 2*

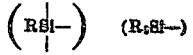

*Class 3*

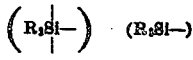

*Class 4*

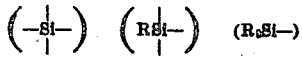

*Class 5*

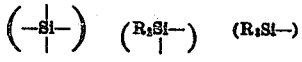

*Class 6*

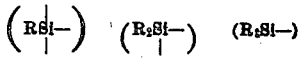

*Class 7*

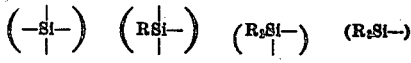

It is to be understood that the order in which the structural units of the various organo siloxanes is represented has no significance because the units may be joined in a multiplicity of ways to form chain and cyclic structures and combinations thereof. Also, the organic radical or radicals in each structural unit may be varied in kind.

The partially dehydrated organo siloxanes or hydrolysis products, after removal of solvents, are generally liquids of various viscosities and they vary in the extent to which dehydration has occurred at this stage. Products containing methyl radicals dehydrate more readily than those containing ethyl, propyl, etc., radicals or phenyl radicals and in general products containing alkyl radicals dehydrate more readily than those containing aryl radicals. The hydrolyzates hereof dehydrate very readily to form the fluids hereof in comparison with hydrolyzates which have a higher ratio of oxygen to silicon. The present fluids have an oxygen to silicon atomic ratio of between 0.5 and 1. This ratio may likewise be expressed in terms of the ratio of the number of hydrocarbon radicals to the number of silicon atoms, the equivalent ratio range on this basis being more than two and less than three. The volatility of these fluids decreases with increasing molecular size of the radicals and at the same time the viscosity may increase somewhat.

The organo siloxanes produced by my method may be adapted to various uses and for any specific use the physical properties and characteristics of the product can be controlled by the proper selection of the initial starting materials so as to obtain the desired oxygen to silicon ratio and a suitable variety of radicals attached to the silicon atom. The products are liquids with little or no tendency for further polymerization even at elevated temperatures and have an oxygen to silicon ratio between 0.5 and 1.0. Such products have good electrical properties whereby they may be used as the liquid filling medium for transformers, circuit breakers, submarine cables, condensers, etc. In general these products have an unusually low coefficient of change of viscosity with temperature and may find use in hydraulic pressure systems which are subjected to wide changes of temperatures or as lubricants for systems of moving parts operating under subnormal or abnormal temperatures.

The following examples will illustrate the mode of operation of the process and the character of the resulting products. In the examples, the starting compound $(C_6H_5)(CH_3)_2SiCl$ was prepared by silicon tetrachloride by the action of the phenyl and methyl Grignard reagents under substantially anhydrous conditions. Fractional distillation of the reaction product yielded $(C_6H_5)(CH_3)_2SiCl$ boiling at 79° C. at 15 mm. pressure. The starting compound

was prepared by reacting methylmagnesium halide with $(CH_3)_2Si(OC_2H_5)_2$ under substantially anhydrous conditions and fractionally distilling the reaction product to recover the trimethylethoxysilane boiling at 75.7° C. at 760 mm. pressure. The other starting compounds were prepared in the conventional manner, i. e. by reacting the proper Grignard reagent with either silicon tetrachloride, ethyl orthosilicate or organic derivatives thereof in suitable molar ratios and fractionally distilling the product.

*Example 1*

Equimolecular parts of $(C_6H_5)(CH_3)_2SiCl$ and $(CH_3)_2Si(OC_2H_5)_2$ were mixed and treated dropwise with the calculated amounts of water for complete hydrolysis diluted with four volumes of alcohol. On evaporation of solvent a mobile liquid remained which was unchanged by heating and which performed satisfactorily as a transformer oil.

Composition: O/Si=0.75.

*Example 2*

Two equivalents of $(C_6H_5)(CH_3)SiCl_2$ and one of $(C_6H_5)(CH_3)_2SiCl$ were mixed and diluted with dioxan. An amount of water slightly in excess of the calculated quantity was slowly added. On dilution with water after completion of the inter-condensation, the product was precipitated as an oil.

Composition: O/Si=0.83.

*Example 3*

2 cc. of anhydrous ethyl alcohol were added to 1 gram of tribenzylsilicon chloride and 8.7 grams of $(CH_3)_2Si(OC_2H_5)_2$. The mixture was allowed to stand for one hour and then an equal volume of a 1/1 mixture of concentrated aqueous HCl and 95% ethyl alcohol was added. The mixture was heated and then diluted with water. The product was a homogeneous oil having useful lubricating properties.

Composition: O/Si=.975.

Example 4

To a solution of $(CH_3)_3Si(OC_2H_5)$ and $(CH_2=C(CH_3)CH)_2SiCl_2$ in the molar proportions 1/2 was added slowly 95% ethyl alcohol to effect hydrolysis and intercondensation. Water was then added in slight excess. After boiling off the solvents, an oily liquid remained.

Composition: $O/Si=0.83$.

Example 5

To a solution of $(C_6H_5.CH_2)(C_6H_5)SiCl_2$ and $(CH_3)_3Si(OC_2H_5)$ in the molar proportions 1/2 was added slowly 95% ethyl alcohol to effect hydolysis and intercondensation. Water was then added in slight excess. After boiling off the solvents, the concentrated product was a slightly viscous liquid.

Composition: $O/Si=0.67$.

Example 6

To a solution of $(CH_3)_2Si(OC_2H_5)_2$ and $(CH_3)_3Si(OC_2H_5)$ in equimolar proportions 95% ethyl alcohol containing a few drops of concentrated hydrochloric acid was added slowly with warming to effect hydroylsis and inter-condensation. Water was then added in excess. After evaporating the solvents, a low viscosity liquid product of wide boiling range was obtained.

Composition: $O/Si=0.75$.

Example 7

As in the previous example $(CH_3)_2Si(OC_2H_5)_2$ and $(CH_3)_3Si(OC_2H_5)$ were cohydrolyzed and inter-condensed, except that the molecular proportions were 10/1 respectively. A liquid product of somewhat higher viscosity and boiling range than that in the previous example was obtained.

Composition: $O/Si=0.95$.

Example 8

To a solution of $(C_6H_5 \cdot CH_2)_3SiCl$ and $(CH_3)_2Si(OC_2H_5)_2$ in the molar proportions 1/5 was added slowly 95% ethyl alcohol to effect hydrolysis and inter-condensation. Water was then added in slight excess. After boiling off the solvents, the concentrated product was a rather viscous liquid.

Composition: $O/Si=0.92$.

For many uses, particularly in fluid pressure operated devices, it is preferred to use instead of the above mixtures of polymers having a range of physical properties, an individual polymer of the species

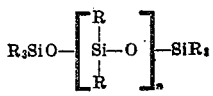

having the definite physical properties of a pure chemical compound where the R's represent the same or different hydrocarbon radicals. These may be obtained by isolation of the individual members from the hydrolysate of a mixture of $R_3SiX$ and $R_2SiX_2$ which is prepared in such a manner as to be substantially completely hydrolyzed and free from cyclic polymers of the formula $(R_2SiO)x$. This is illustrated by Example 9 which shows the preparation of a random mixture of polymers belonging to the series

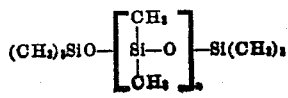

and the separation of the individual members where $n$ is 1 through 13 by distillation under high vacuum.

Example 9

In a 5 liter three-necked flask, fitted with a reflux condenser, agitator and thermometer, were placed 1393 grams (9.41 mol) of redistilled $(CH_3)_2Si(OC_2H_5)_2$ and 1110 grams (9.41 mol) of $(CH_3)_3SiOC_2H_5$. To this solution was added 254 grams (14.11 mol) of water containing 7.5 grams of NaOH, (approximately 1 NaOH per 100 silicon atoms). This insured the formation of only straight chain polymers. The mixture was heated to 40° C. and the temperature continued to rise for nearly an hour. After adding 50 cc. (20% excess) more water, the mixture was refluxed for 2 hours and then allowed to stand overnight.

Alcohol was then distilled off, until the temperature reached 100° C. 1706.6 grams of distillate was collected. (Theory 1430 grams.) This alcohol was poured into four times its volume of water and an insoluble oil separated (457 grams). The insoluble fraction was added back to the copolymer residue from the distillation and 555 cc. of 20% hydrochloric acid was added. The acid mixture was refluxed for two hours, and the silicon oils were carefully washed with distilled water until neutral. The yield was 1426 grams (theory 1469 grams).

The oil was distilled in a fractionating column packed with glass helices, first at atmospheric pressure, then at reduced pressure. The fractions from the plateaus in the distillation curve were fractionated and the properties of the pure siloxane polymers were determined. These individual fractions are members of the series

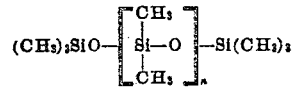

where $n=0$ to 7 inclusive, that is, the fractions consisted of trimethylsilicyl ether and inter-condensates of $(CH_3)_3Si-O-$ with

containing from 3 to 9 silicon atoms inclusive. The residue from the fractional distillation was placed in a Claissen flask and distilled under high vacuum without fractionation. This gave a clear distillate distilling over a range of from 125° to 215° C. at 0.125 mm. Refractionation of this distillate showed it to be composed of members of the above series where $n$ is 8 to 13 inclusive. That is, it consisted of inter-condensates of $(CH_3)_3Si-O-$ with

containing from 10 to 15 silicon atoms inclusive.

In the preparation of mixtures of molecular species having the general formula

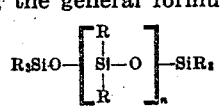

it is apparent that the average value of $n$ will depend in general upon several factors which include (1) the molecular ratio of

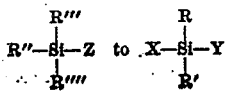

in the mixture to be hydrolyzed; (2) the relative ease of hydrolysis of the hydrolyzable group Z to that of the groups X and Y; (3) the relative ease of elimination of HZ to HX and HY or of HOH in the event of incomplete hydrolysis of groups X, Y and Z at any instant during the hydrolysis and inter-condensation.

It is recognized also in the preparation of tri-organo-silicyl end-blocked polysiloxanes by the said conjoint hydrolysis and inter-condensation of a mixture of R₃SiZ and R₂SiXY that such preparations may contain linear molecules of the general formula

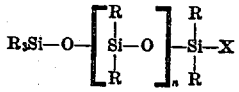

in which one end of the polysiloxane chain terminates in a tri-organo-silicyl group and the other terminal Si still contains a hydrolyzable radical. Such molecules can be converted to poly-siloxanes having both terminal Si atoms bearing three organic radicals linked by C—Si in either of the following ways: (1) continued hydrolysis to replace X with OH and condensation to form

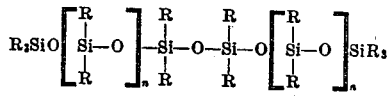

or (2) interaction with R₃SiOH or (3) conjoint hydrolysis and inter-condensation in the presence of R₃SiZ.

Example 10

SiCl₄ and C₆H₅Me₂SiCl were mixed in the molar ratio 1/3. After dilution with two volumes of dioxane, aqueous dioxane was added with great care. In spite of precautions a considerable amount of silica precipitated out showing clearly that satisfactory inter-condensation had not occurred. On evaporation, however, the liquid portion was somewhat more viscous than the oil obtained from C₆H₅Me₂SiCl alone. This behavior is undoubtedly due to the wide difference in reactivity of the SiCl₄ and the trisubstituted halide.

To avoid this difficulty a mixture of halides of the same composition was again diluted with dioxane. To this mixture glacial acetic acid was then added. There was no sign of precipitation. Some HCl was evolved after adding a volume of glacial acetic acid approximately equal to the original halide mixture and warming gently, another volume of aqueous acetic acid (1/3) was added with further warming. On evaporation of solvent an oil of medium viscosity resulted. This oil showed no tendency to body or change with heating at 180° C. for 20 hours.

Composition: (—OSiO—) (C₆H₅Me₂SiO—); O/Si=0.87.

I claim:

1. A liquid copolymeric siloxane of the type

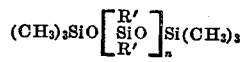

where R' is an alkenyl radical and $n$ has an average value such that the ratio of hydrocarbon radicals to silicon atoms is more than 2 and less than 3.

2. A liquid copolymeric siloxane of the type

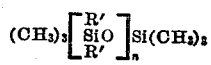

where R' is a methallyl radical and $n$ has an average value such that the ratio of hydrocarbon radicals to silicon atoms is more than 2 and less than 3.

JAMES FRANKLIN HYDE.

REFERENCES CITED

The following references are of record in the file of this patent:

UNITED STATES PATENTS

| Number | Name | Date |
|---|---|---|
| 2,258,218 | Rochow | Oct. 7, 1941 |

OTHER REFERENCES

Rochow, "Chemistry of the Silicones," 1946, pages 70, 71.

Volnov, "Jour. Gen. Chemistry" (U. S. S. R.), vol. 10 (1940), pages 1600–1604.